United States Patent [19]

Koseki

[11] Patent Number: 4,731,658
[45] Date of Patent: Mar. 15, 1988

[54] FACSIMILE MACHINE USING CUT SHEET OF PAPER

[75] Inventor: Yuji Koseki, Machida, Japan

[73] Assignee: Ricoh Company, Ltd., Tokyo, Japan

[21] Appl. No.: 853,224

[22] Filed: Apr. 17, 1986

[30] Foreign Application Priority Data

Apr. 19, 1985 [JP] Japan ................................ 60-82658

[51] Int. Cl.$^4$ ............................................... H04N 1/04
[52] U.S. Cl. .................................... 358/287; 358/257
[58] Field of Search ............... 358/280, 287, 293, 257, 358/256

[56] References Cited

U.S. PATENT DOCUMENTS 4,568,973  2/1986  Ishida ................................... 358/287
4,580,171  4/1986  Arimoto ............................... 358/287
4,598,323  7/1986  Homjo et al. ........................ 358/280

Primary Examiner—Edward L. Coles, Sr.
Attorney, Agent, or Firm—Oblon, Fisher, Spivak, McClelland & Maier

[57] ABSTRACT

A facsimile machine using a cut sheet of paper for recording image data thereon is provided with a function of recoding the image data on the cut sheet of paper as reduced in size with a size reduction rate determined by the size of the image data and the size of the cut sheet of paper if the image data to be recorded is longer than the cut sheet or paper but the length of the image data does not exceed a predetermined value. The facsimile machine is also provided with a function of recording the image data on two or more cut sheets of paper as divided with unity magnification if the size of the image data exceeds the predetermined value.

6 Claims, 8 Drawing Figures

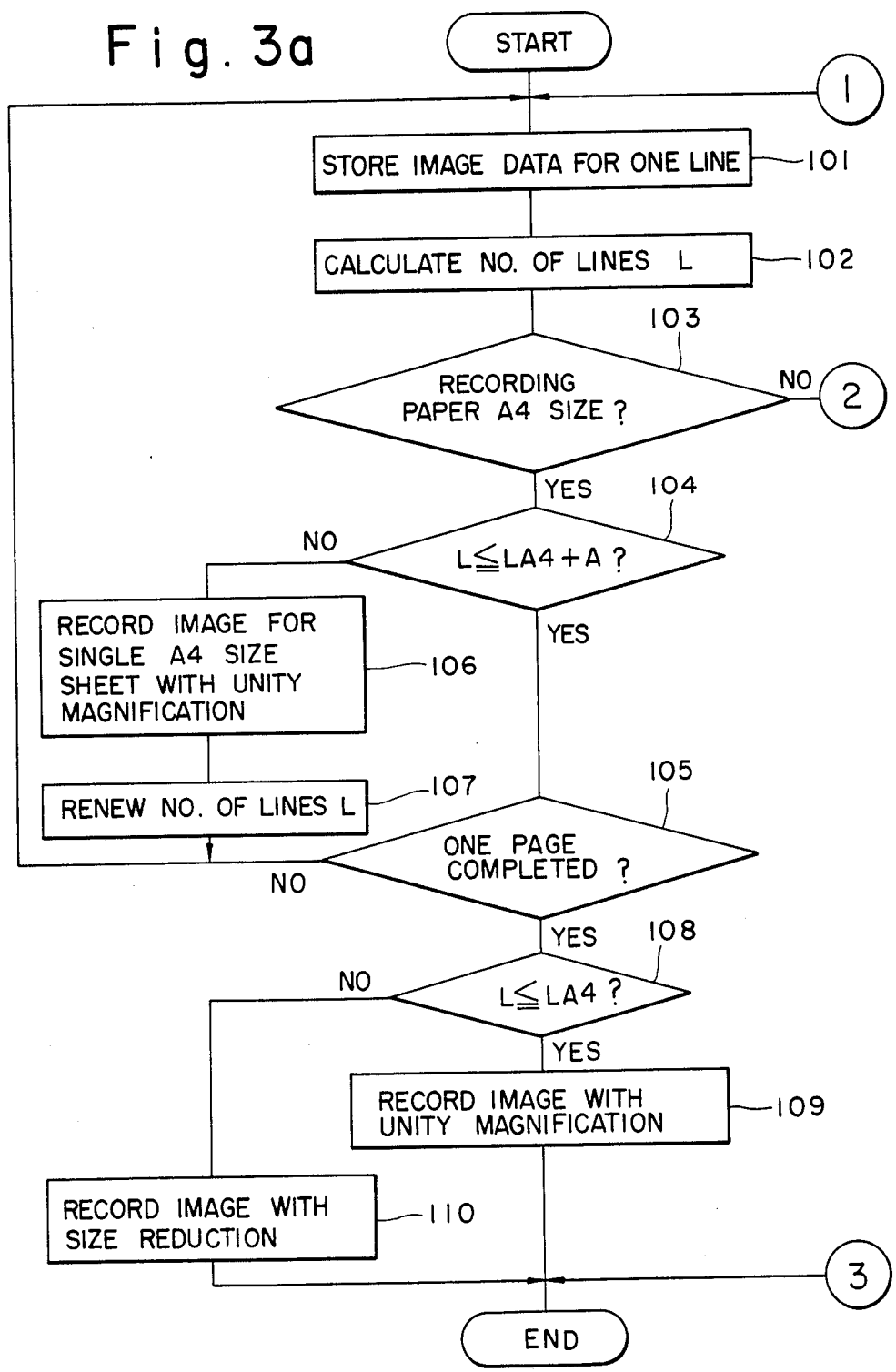

FACSIMILE MACHINE USING CUT SHEET OF PAPER

BACKGROUND OF THE INVENTION

1. Field of the Invention

This invention generally relates to a facsimile machine, and, in particular, to a facsimile machine using a cut sheet of paper as a recording medium.

2. Description of the Prior Art

Typically, in a facsimile communication system, in order to allow an operator at a receiver side to recognize the identity of a transmitter and the date and time of transmission, these information, including other additional information, such as page number, is added when transmitting data from the transmitter side to the receiver side. In many cases, such additional information is added in front of image information to be transmitted, so that it is normally recorded at the top of a recording medium. Accordingly, as shown in FIG. 7, when information transmitted from the transmitter is recorded on a recording medium at the receiver side, an image RP at the receiver side is longer than the original image TP by the length L1 of additional information AP. In many prior art facsimile machines, use is made of a continuous recording medium in the form of a roll, so that no particular problems arises even if the recored image RP at the receiver side becomes longer than the original image TP transmitted from the transmitter side because the recording medium is cut appropriately after recording.

In such facsimile machines using a continuous recording medium in the form of a roll, in order to absorb errors in positioning of the recording medium and in the cutting position of the recording medium, a pair of top and bottom margins WT1 and WT2 having the length of L2 and L3, respectively, is provided at the leading and trailing edges of the recorded image RP at the receiver, as illustrated in FIG. 8, so that the recorded image RP at the receiver side is set to have the length LL2 which is longer than the length LL1 of the original image by a sum of the lengths L2 and L3 of the respective top and bottom margins WT1 and WT2. If the additional information is added to this recorded image RP, then the total length of such recorded image RP becomes longer by the length L1 of the additional information, as described above.

Recently, a facsimile machine using a cut sheet of paper as a recording medium has been introduced. In this facsimile machine, since the length of a recording medium is fixed, if the recorded image RP becomes longer than the original image TP due to the addition of the additional information AP and/or top and bottom margins WT1, WT2, there is a chance that the original image is lost partly when recored at the receiver side. In order to cope with this situation, it has been proposed to record the excessive portion of the original image on the second cut sheet of paper. However, such a scheme is not advantageous at all times because if the excessive portion of the original image includes only a few lines or only the the bottom margin WT2, a complete cut sheet of paper is expended only such scarce image information or no image information portion.

SUMMARY OF THE INVENTION

In accordance with the present invention, there is provided a novel facsimile machine wherein if an image to be recorded at a receiver side is longer than a recording medium having a fixed length, the image is recored on the recording medium as reduced in size at least in the auxiliary scanning direction by a reduction rate determined by the length of the image to be recorded and the length of the recording medium; whereas, if the length of the image to be recorded exceeds a predetermined value, the image to be recorded is recored on two or more recording mediums.

It is therefore a primary object of the present invention to obviate the disadvantages of the prior art as described above and to provide an improved facsimile machine using a recording medium having a fixed length.

Another object of the present invention is to provide a facsimile machine capable of preventing waste recording mediums of fixed size.

Other objects, advantages and novel features of the present invention will become apparent from the following detailed description of the invention when considered in conjunction with the accompanying drawings.

DESCRIPTION OF THE PREFERRED EMBODIMENTS

Figure 1:
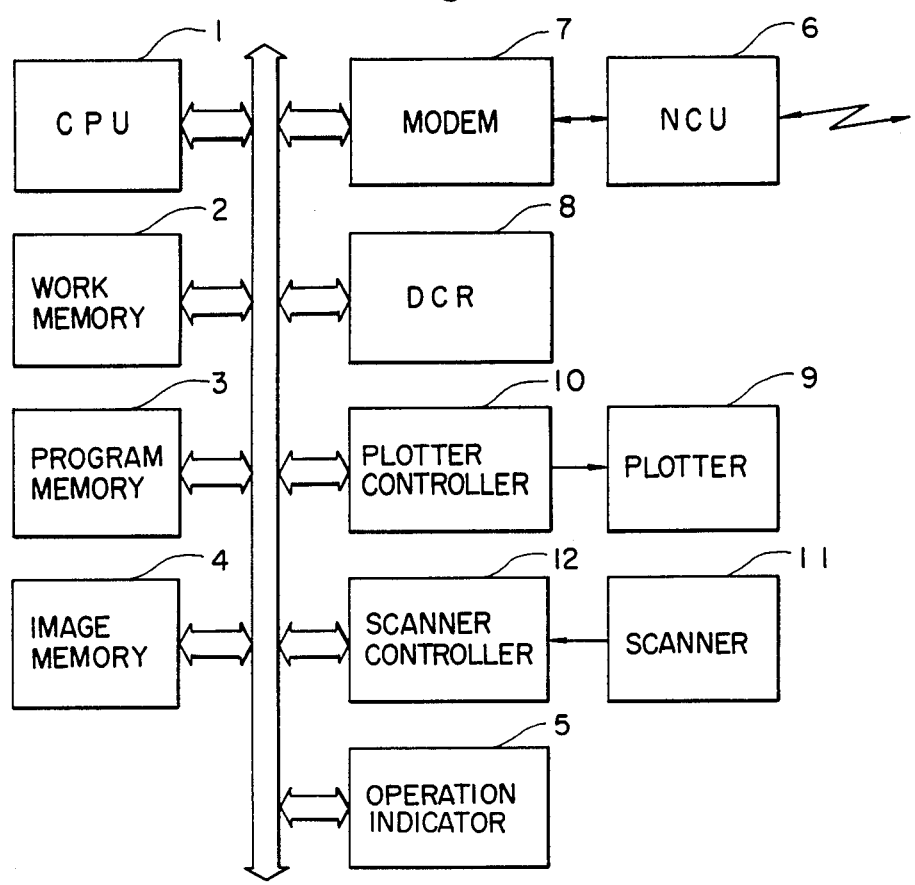
FIG. 1 is a block diagram showing the overall system of a facsimile machine constructed in accordance with one embodiment of the present invention.

Referring now to FIG. 1, there is shown in block form the overall structure of a facsimile machine constructed in accordance with one embodiment of the present invention. As shown, the facsimile machine includes a central processing unit or simply CPU 1 in charge of the overall control operation of the facsimile machine, a work memory 2 containing various work regions for implementing various control operations, and a program memory 3 for storing therein various execution programs. Also provided is an image memory 4 for temporarily storing therein an image signal which has been decoded upon reception from a transmitter.

Assuming that the present facsimile machine is structured to have the ability of using a cut sheet of recording paper up to B4 size, the image memory 4 is so structured to have the memory capacity for storing image data including the data of the original TP of B4 size plus the image data of the additional information AP plus the data for average length of the top and bottom margins WT1, WT2 (e.g., 10% of the length of B4 size sheet). The illustrated facsimile machine further includes an operation indicator 5 which includes various keys which may be depressed by the operator for controlling the operation of the present facsimile machine and various indicators which are selectively activated to indicate the status of the present facsimile machine.

The present facsimile machine also includes a net control unit or simply NCU 6 which is used for establishing a connection between the present facsimile machine and a transmission line, such as public telephone line, and a MODEM 7 is provided as connected to the NCU 6 so as to allow data to be modulated or demodulated when transmitting data to or receiving data from the transmission line. A coder/decoder unit or DCR 8 is also provided so that the data to be transmitted may be coded before being sent for transmission so as to increase the rate of transmission, and, on the other hand, if the data received is coded, the coded data may be decoded into the original image data by this element. The image data thus received and decoded is recorded on a recording medium, or a cut sheet of paper in the illustrated example, by a plotter 9 under control of a plotter controller 10. On the other hand, an original image to be transmitted is optically read by a scanner 11 under control of a scanner controller 12 thereby obtaining an electrical image signal.

Figure 2:
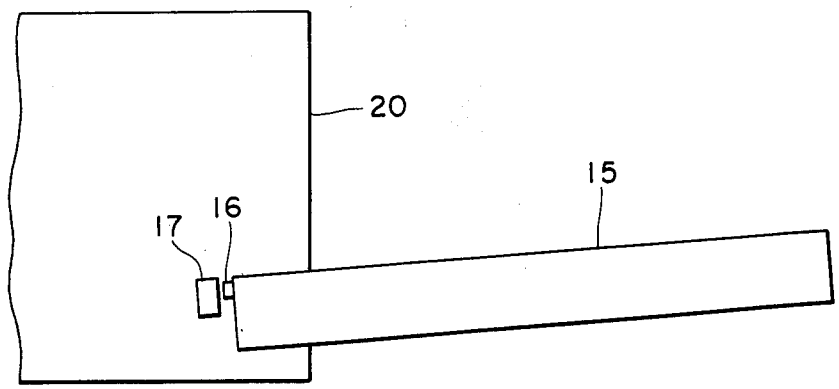
FIG. 2 is a schematic illustration showing a mechanism for detecting the size of a cut sheet of recording paper stored in a cassette when mounted in position as partly inserted into a housing of the facsimile machine of FIG. 1.

As shown in FIG. 2, a paper cassette 15 storing therein a quantity of cut sheets of paper in the form of a stack (not shown) is detachably mounted in position as partly fitted into a housing 20 of the present facsimile machine. Typically, two or more cassettes storing cuts sheet of recording paper different in size are prepared and they are selectively mounted in position as detachably fitted into the housing as shown in FIG. 2. Since the cut sheets of paper stored normally differ in size one cassette from another, the cassette 15 is normally provided with an size indicator 16, or at the front end of the cassette 15 in the illustrated example. On the other hand, the housing 20 is normally provided with a size detector 17 which comes to be located opposite to the size indicator 16 of the cassette 15 when the cassette 15 is set in position, so that the size indicator 17 produces a signal indicating the size of cut sheets of recording paper stored in the cassette 15 now set in position and sends it to the CPU 1. Thus, the CPU 1 knows the size of a cut sheet of paper to be passed through the plotter 9 for recording image information received from the transmitter.

With the above-described structure, the operation will be described in the case when image information is transmitted from a transmitter to the present facsimile machine functioning as a receiver. At first, when a calling signal from the transmitter is received by the present facsimile machine, the NCU 6 responds to the calling signal by establishing a transmission path with the calling transmitter, and, at the same time, apprises of this fact to the CPU 1 so that the CPU 1 initiates a transmission/reception control procedure. During this procedure, the present facsimile machine, together with the transmitter, establishes various conditions necessary for communication, such as mode of transmission and paper size, and training of the MODEM 7 is carried out. Thereafter, when the present facsimile machine receives image information transmitted from the transmitter, it is demodulated by the MODEM 7 and then decoded to an image signal by the DCR 8, which is then temporarily stored into the image memory 4 under the control of the CPU 1. The subsequent processing steps will be described also with reference to the flow chart shown in FIG. 3.

Figure 3:
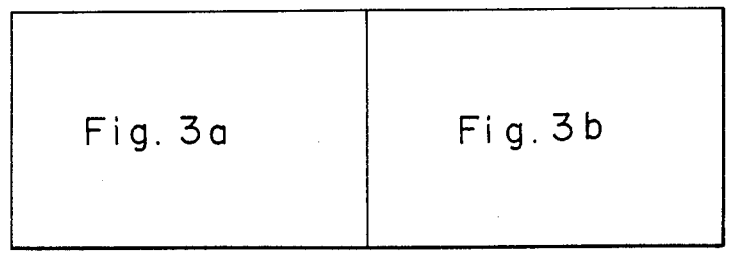
FIGS. 3a–b are flow charts showing part of the sequence of steps for processing data when the facsimile machine operates in a receiving mode.

As shown in the flow chart of FIG. 3, the CPU 1 causes one line of image data from the DCR 8 to be stored into the image memory 4 at step 101 and the number of lines L stored in the image memory 4 is then calculated at step 102. If it is found that the cuts sheet of recording paper stored inside of the cassette 15 are A4 size at step 103, then it proceeds to a step 104 where it is decided as to whether the number L of lines is smaller than a sum of the total number LA4 of lines of the A4-sized original and the number A of lines for the before-mentioned additional information AP and a predetermined average (e.g., 10% of the length of A4 size) of the length for the top and bottom margins WT1 and WT2. If the result of this judgement at step 104 is affirmative, and, furthermore, if it has not yet been completed with reception of data for a single page (i.e., the result of judgement at step 105 is negative), then a loop including steps 101 through 105 is repeated, thereby storing the received image information into the image memory 4 in sequence.

In the case where the received image data RP is relatively long, if the result of judgement at step 104 during this loop processing indicates negative, then the image data stored in the image memory 4 at that time is read out by the amount of LA4 number of lines corresponding to one sheet of A4 size and output to the plotter controller 10, so that the image data is recorded on a cut sheet of paper by the plotter 9 with unity magnification at step 106, and, then, after renewing the number L of lines to (L−LA4) at step 107, it goes back to step 101. At steps 106 and 107, utilizing the fact that the recording speed at the plotter 9 is much faster than the speed of outputting image data from the DCR 8, the transfer processing of image data to the plotter 9 is carried out while the image data is being stored into the image memory 4. Moreover, at step 106, the memory region of the image memory 4 where the image data having been transferred to the plotter 9 has been stored is released. Thus, this memory region of the image memory 4, which has been occupied by the image data transferred to the plotter 9 at step 106, is made available for storage of the following image data.

Upon completion of receipt of the image to be recorded RP by the amount of single page, the judgement at step 105 indicates affirmative, so that it now goes out of the above-mentioned loop, and, then, it is determined whether or not the next number L of lines is larger than the total number LA4 of lines at step 108. If it is determined to be affirmative at step 108, then all of the image data stored in the image memory 4 is transferred in sequence to the plotter controller 10 to be recorded by the plotter 9 with unity magnification at step 109. On the other hand, if the determination at step 108 is negative, then the image data stored in the image memory 4 is transferred to the plotter controller 10 as being reduced in size in the auxiliary scanning direction with the reduction rate of LA4/L and the image data is recorded by the plotter 9 as being reduced in size in the auxiliary scanning direction with the reduction rate of LA4/L at step 110. Here, it is to be noted that the auxiliary scanning direction indicates the direction of movement of a cut sheet of recording paper on which recording of image data is effected by the plotter 9. On the other hand, the main scanning direction indicates the direction transverse to the direction of movement of a cut sheet of recording paper, or auxiliary scanning direction. That is, if use is made of a laser printer for the plotter, the main scanning direction is the direction of scanning a laser beam; whereas, if use is made of a thermal print head including a plurality of heat-producing elements arranged in a single array, the main scanning direction is the longitudinal direction of the array along which the plurality of heat-producing elements are arranged.

On the other hand, if the cut sheet of recording paper used is B4 size, the judgement at step 103 becomes negative, and, thereafter, it carries out a loop processing including steps 111 through 117 in a manner similar to the case of A4 size. It is to be noted that the steps 111 through 117 are similar in function to the steps 104 through 110 described above.

In this manner, in the case where received image data to be recored is longer than the cut sheet of recording paper set in the plotter 9, the received image data is, in principle, recorded on the cut sheet of recording paper as suitably reduced in size. On the other hand, in the case where the received image data is significantly long to the extent that it exceeds the capacity of the image memory 4, the image data is first recored in sequence from its start over an amount corresponding to the amount of a single cut sheet of recording paper with unity magnification, and then the memory region used for storing that portion of the image data which has just been recorded is released to be made available for storing the following portion of the image data. Accordingly, in the latter case, the image data is recorded on two or more cut sheets of recording paper as suitably divided in the auxiliary scanning direction.

It is to be noted that other functions of the present facsimile machine, such as transmission control, are not directly related to the subject matter of the present invention and are similar to those of the conventional facsimile machines, so that their detailed description is hereby omitted.

As a specific example, if the resolution of the present facsimile machine in the auxiliary scanning direction is 7.7 lines/mm, LA4 is 2,287 because the length of an A4-sized original in the auxiliary scanning direction is 297 mm. In addition, 230 (approximately equal to 29 mm and 10% of the length of the A4 size) is set for A. Furthermore, since the length of a B4-sized original is 364 mm in the auxiliary scanning direction, LB4 is equal to 2,803 and 280 (approximately equal to 36 mm) is set for B.

Figure 4:
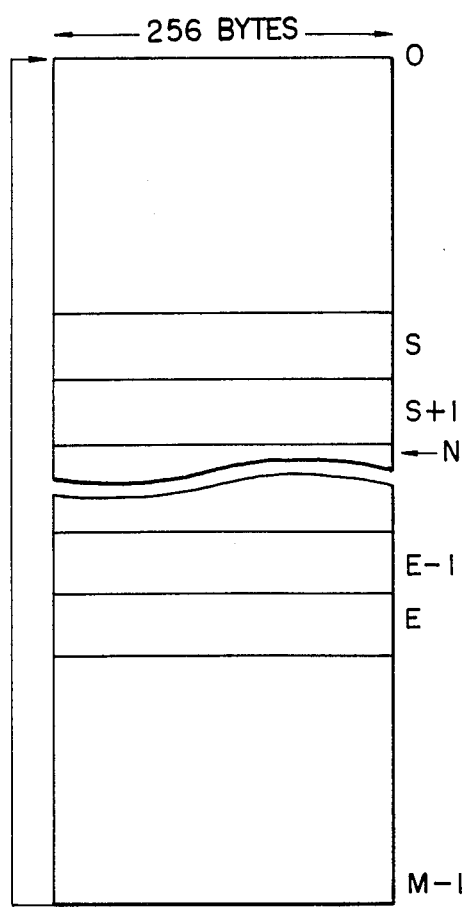
FIG. 4 is a schematic illustration showing a memory map adopted in the image memory provided in the system of FIG. 1.
Figure 5:
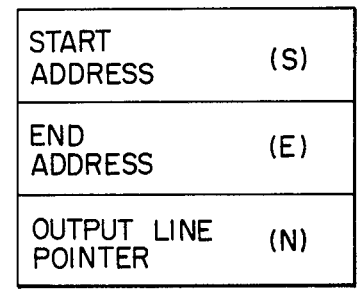
FIG. 5 is a schematic illustration showing as an example a region of the work memory provided in the system of FIG. 1 for storing therein data for management of access to the image memory.
Figure 3B:
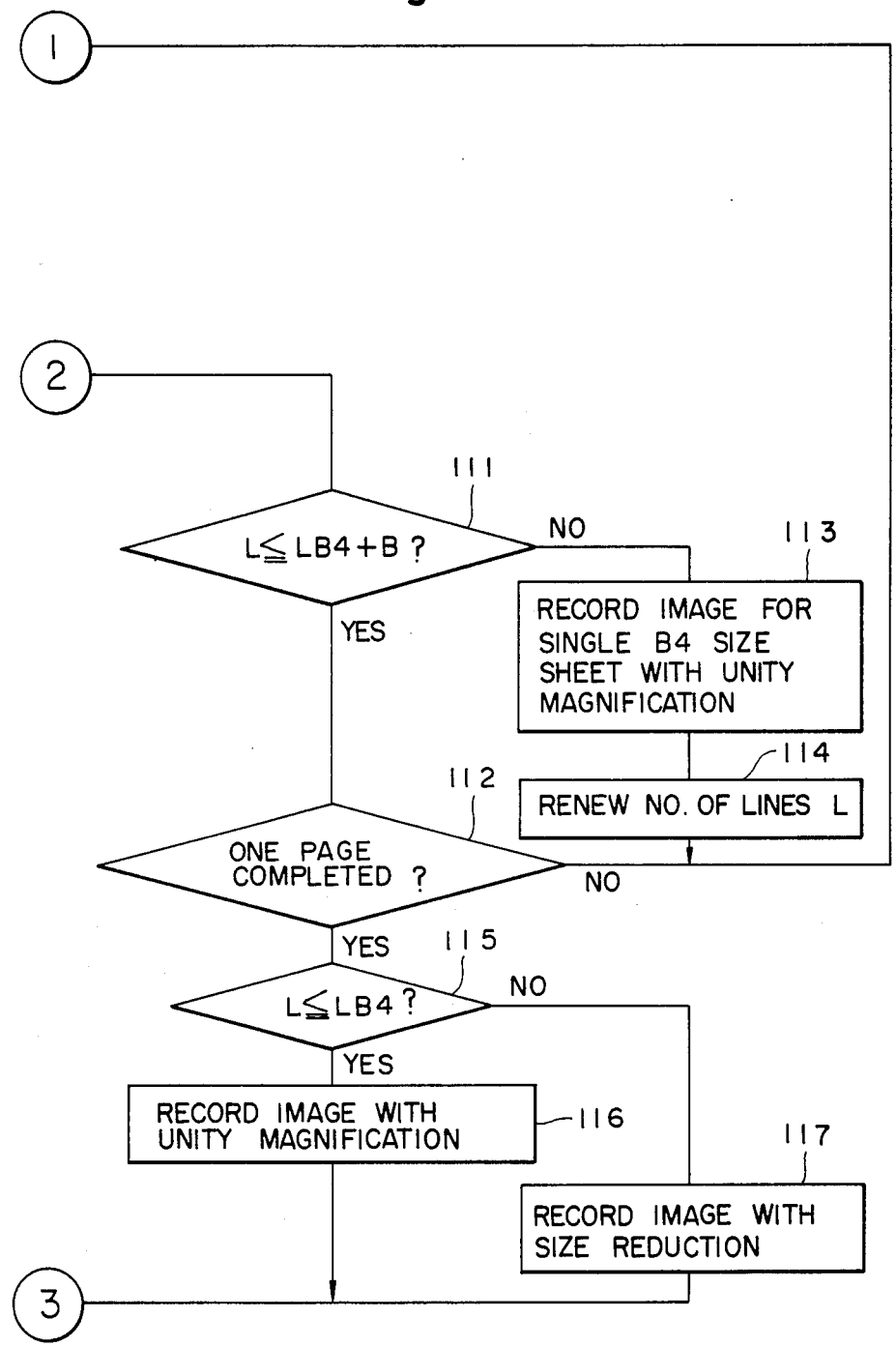

FIG. 4 schematically illustrates an example how image data to be recorded is stored in the image memory 4. This image memory 4 is comprised of an M plurality of line memories arranged in series, each capable of storing 256 bytes (1 byte = 8 bits) of image data corresponding to one line of a B4-sized original, where M is an integer number. Incidentally, under the above-described conditions, M is equal to 3,083. Furthermore, the CPU 1 causes start and end addresses S and E, indicating the front and end positions of the memory region where the image data is stored in the image memory 4, and an output line pointer N, indicating the location of the image data where reading takes place, to be stored in the work memory 5 as shown in FIG. 5 so as to be capable of accessing the image memory 4. Accordingly, the number of lines L of the image data stored in the image memory 4 at a certain point in time may be calculated by $(E+1-S)$. In addition, after having stored the image data to the physically final memory region of the image memory 4, the CPU 1 returns to the first memory region of the image memory 4, thereby using the image memory 4 as a cyclic memory. With this structure, even in the case where the image data larger in capacity than the image memory 4 is to be input into the image memory 4, since the image data is stored into the image memory 4 and recorded on a page by page basis in sequence as described above, the image data is not lost and can be received and recorded properly in separate sheets of recording paper.

Figure 6:
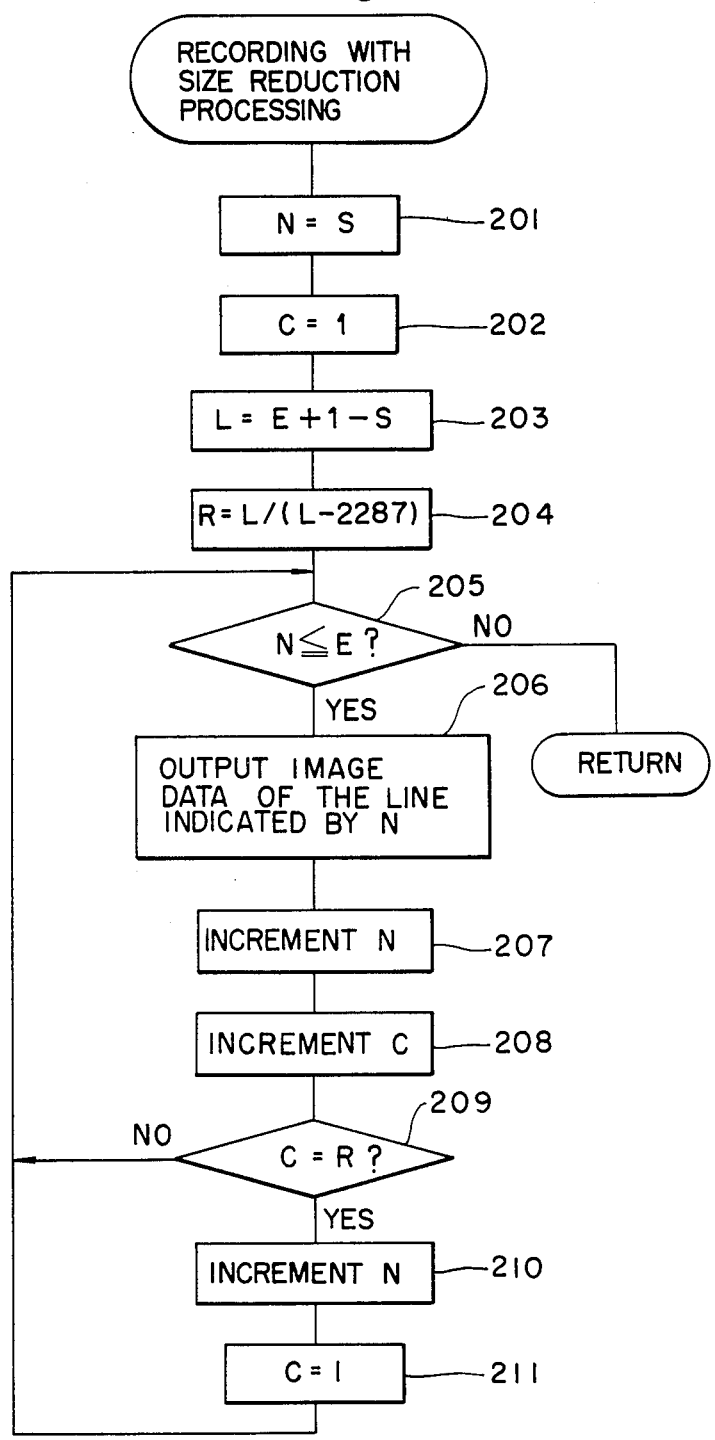
FIG. 6 is a flow chart showing the sequence of steps of an example for processing data in a size reduction recording mode.
Figure 7:
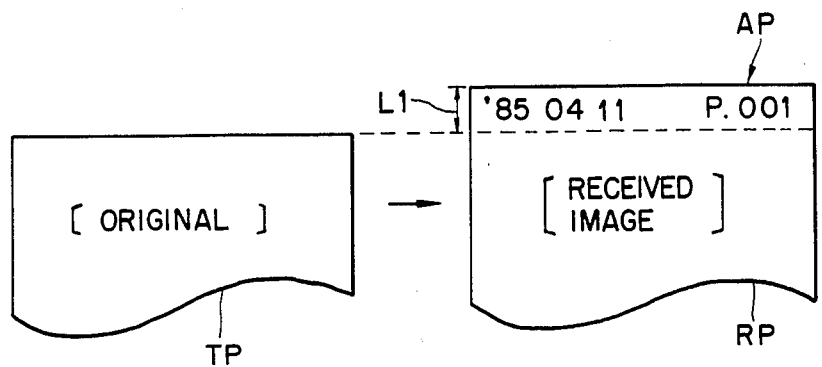
FIG. 7 is a schematic illustration showing an example how data is recorded at the receiver side upon receipt thereof as transmitted from the transmitter side in a facsimile communication system.
Figure 8:
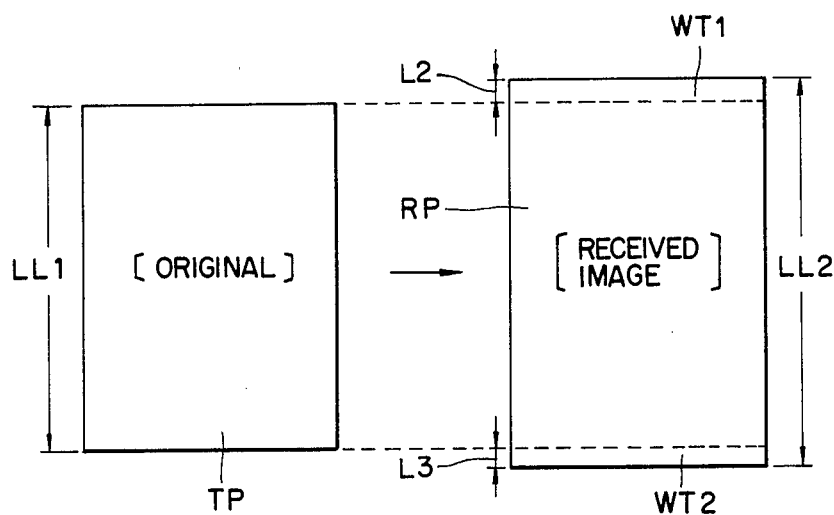
FIG. 8 is a schematic illustration showing another example of recording data at the receiver side upon receipt thereof as transmitted from the transmitter side in a facsimile communication system.

FIG. 6 illustrates a flow chart showing a sequence of steps of one example of process for recording received image data as reduced in size in the auxiliary scanning direction. It is to be noted that the illustrated example is the case where the cut sheets of recording paper used have A4 size. In the first place, the output line pointer N is set at a start address S at step 201, and a counter C for determining lines to be eliminated is initialized to 1 at the following step 202. Next, at step 203, the current number of line L at that time is calculated, and, on the basis of this thus calculated number of line L, the line spacing R for discarding some of the lines from the image data received so as to have the image data reduced in size in the auxiliary scanning direction is calculated at step 204. Then, the following process is repeated until the output line pointer N becomes equal to the end address E, or the result of the judgement at step 205 becomes negative.

That is, in the first place, that line of the image data indicated by the output line pointer N is read out of the image memory 4 and transferred to the plotter controller 10 at step 206, and then the output line pointer N and the counter C are incremented at steps 207 and 208, respectively. At this time, it is determined whether or not the counter C has a count equal to the line spacing R at step 209, and if the result of the judgement at this step 209 is negative, then it goes back to step 205 so as to output the next line of image data. On the other hand, if the result of the judgement at step 209 is affirmative, then since this indicates the fact that the next line of image data is to be eliminated, it goes through the steps of incrementing the output line pointer N at step 210, initializing the counter C to 1 at step 211 to skip the next following line, and returning to the step 205. In this manner, in accordance with the above-described scheme, since those lines of image data which correspond to the line spacing R for elimination are discarded and not output to the plotter controller 10, the image data is recored as reduced in size in the auxiliary scanning direction with the reduction rate of LA4/L. It is to be noted that the image reduction processing for the case of B4-size recording paper is basically the same that described for A4-sized recording paper excepting that the constant value of 2,287 at step 204 must be substituted by 2,803.

In the above-described embodiment, the facsimile machine is so illustrated that only one paper cassette is detachably mounted; however, the present invention may also be applied to facsimile machines so structured to be capable of being detachably mounted with a plurality of paper cassettes at the same time. It should also be noted that the present invention should not be limited to the use of any particular mechanism for detecting the size of the recording paper stored in the paper cassette, for example the one described previously with reference to FIG. 2, and the present invention may be used with any mechanism for detecting the size of the recording paper stored in the paper cassette. Besides, as described before, the plotter 9 may include any desired type of printing or plotting apparatus, such as an electrostatic printer, optical write-in type printer like a laser printer, or thermal printer. In addition, although certain lines of image data have been removed at a line spacing corresponding to the size reduction rate in the above-described embodiment, the present invention should not be limited to any particular scheme of reducing the size of original image when recording on recording paper of fixed size.

As described above, in accordance with the present invention, if image data to be recorded as received is longer than the length of recoding paper but does not exceed a predetermined value, the image data is recorded as reduced in size in the auxiliary scanning direction with the size reduction rate determined by the length of the image data and the length of the recording paper; whereas, if the length of the image data exceeds the predetermined value, the image data is recorded on two or more sheets of the recording paper as divided. Thus, even if use is made of recording paper of fixed size, the image data may be properly recorded on the recording paper at all times and the usage of the recording paper may be made economical and optimized.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A facsimile machine comprising:

storing means for temporarily storing image data to be recorded;

recording means for recording said image data on a recording medium having a fixed size;

detecting means for detecting the size of said recording medium to be used in recording said image data; and control means for controlling recording of said image data on said recording medium such that said image data is recorded on a single sheet of said recording medium as reduced in size with a reduction rate determined by the size of said recording medium and the detected size of said image data if the size of said image data is larger than the size of said recording medium but does not exceed a predetermined value, whereas said image data is recorded on two or more sheets of said recording medium as divided if the size of said image data exceeds said predetermined value.

2. The facsimile machine of claim 1 wherein said storing means includes a plurality of line memories each storing a line of said image data, whereby that portion of the image data which is stored in selected one of said plurality of line memories is eliminated when said image data is to be recorded as reduced in size under control of said control means.

3. The facsimile machine of claim 2 wherein the selective elimination of the image data is carried out at a regular interval.

4. The facsimile machine of claim 3 wherein said size reduction is carried out in a direction of movement of said recording medium.

5. The facsimile machine of claim 1 further comprising a cassette for containing therein a quantity of said recording mediums having said fixed size, said cassette being detchably mountable in said facsimile machine.

6. The facsimile machine of claim 5 wherein cassette is provided with an indicator for indicating the size of the recording mediums contained therein, and said detecting means cooperate with said indicator to detect the size of the recording mediums contained in the cassette when set in position.

* * * * *